US009083607B2

(12) United States Patent
Liu et al.

(10) Patent No.: US 9,083,607 B2
(45) Date of Patent: Jul. 14, 2015

(54) METHOD AND DEVICE FOR PROCESSING DATA CELL

(75) Inventors: Jianli Liu, Shenzhen (CN); Min Zeng, Shenzhen (CN)

(73) Assignee: ZTE CORPORATION, Shenzhen, Guandong Province (CN)

(*) Notice: Subject to any disclaimer, the term of this patent is extended or adjusted under 35 U.S.C. 154(b) by 136 days.

(21) Appl. No.: 13/976,938

(22) PCT Filed: Oct. 24, 2011

(86) PCT No.: PCT/CN2011/081179
§ 371 (c)(1),
(2), (4) Date: Jun. 27, 2013

(87) PCT Pub. No.: WO2012/088950
PCT Pub. Date: Jul. 5, 2012

(65) Prior Publication Data
US 2013/0286894 A1    Oct. 31, 2013

(30) Foreign Application Priority Data
Dec. 29, 2010  (CN) .......................... 2010 1 0612421

(51) Int. Cl.
H04L 12/28    (2006.01)
H04L 12/751   (2013.01)
H04L 12/761   (2013.01)
H04L 12/709   (2013.01)

(52) U.S. Cl.
CPC ................ H04L 45/02 (2013.01); H04L 45/16 (2013.01); H04L 45/245 (2013.01); Y02B 60/33 (2013.01)

(58) Field of Classification Search
CPC .......... H04L 45/02; H04L 12/56; H04L 12/28
USPC ................... 370/220–390, 393–401
See application file for complete search history.

(56) References Cited

U.S. PATENT DOCUMENTS 6,553,028 B1 *   4/2003   Tang et al. .................... 370/389
6,778,532 B1 *   8/2004   Akahane et al. ............. 370/392

(Continued)

FOREIGN PATENT DOCUMENTS

CN    1731760 A    2/2006
CN    101150490 A   3/2008

(Continued)

OTHER PUBLICATIONS

International Search Report for PCT/CN2011/081179 dated Dec. 30, 2011.

*Primary Examiner* — Iqbal Zaidi
(74) *Attorney, Agent, or Firm* — Ling Wu; Stephen Yang; Ling and Yang Intellectual Property

(57) ABSTRACT

A method and device for processing data cells are disclosed. The method includes: configuring a unicast routing table which includes a corresponding relation between unicast destination addresses and port trunking (Trunks), and a multicast routing table which includes a corresponding relation between multicast group addresses and Trunks; receiving data cells; determining a corresponding Trunk according to types of the data cells, if the data cell is a unicast cell, extracting a destination address of the unicast cell, querying the unicast routing table, and obtaining a Trunk corresponding to the unicast cell; and if the data cell is a multicast cell, extracting a multicast group address of the multicast cell, querying the multicast routing table, and obtaining one or more Trunks corresponding to the multicast cell; and selecting an output link from the determined Trunks according to a preset load balancing policy, and sending data cells through the selected output link.

8 Claims, 5 Drawing Sheets

(56) References Cited

U.S. PATENT DOCUMENTS

| | | | |
|---|---|---|---|
| 6,920,106 B1 * | 7/2005 | Chou et al. | 370/229 |
| 7,570,639 B2 | 8/2009 | Kalkunte et al. | |
| 2002/0027908 A1 | 3/2002 | Kalkunte et al. | |

FOREIGN PATENT DOCUMENTS

| | | |
|---|---|---|
| CN | 101527686 A | 9/2009 |
| CN | 102065014 A | 5/2011 |

* cited by examiner

METHOD AND DEVICE FOR PROCESSING DATA CELL

TECHNICAL FIELD

The present document relates to the field of data communication, and particularly, to a method and device for processing data cells.

BACKGROUND OF THE RELATED ART

In the field of data communication, the requirements on switching capacity of data products are increasingly higher. Currently, the switching capacity supported by a switched network dedicated chip is also more and more higher, the number of ports supported by the switched network dedicated chip is also more and more larger, such as 64×64 switching, 96×96 switching and 128×128 switching, and meanwhile, cascading of a three-stage CLOS network is also supported.

In the practical networking, there exists a great flexibility in the networking ways. In a condition that the switching capacity is satisfied, or in order to guarantee a connection robustness of the system, multiple link connections are set usually between switched network chips. On one hand, a utilization rate of ports of the switched network chips is improved; on the other hand, the transmission bandwidth between two chips is also improved. In order to make a description conveniently, a concept of port trunking (Trunk) of the switched network is proposed, which specifically refers to combining two or multiple physical ports together to constitute a logic port through register configuration, and the physical bandwidth of this logic port is equal to a sum of bandwidths of all member ports. Therefore, a method for flexibly networking and increasing port bandwidths is provided.

When N links are connected between two switched network chips, it is called that Trunk=N. FIG. 1 is a schematic diagram of the connection of Trunks of the switched network, 4 link connections (101) exist between a switched network chip A and a switched network chip B, which is called as Trunk=4, and 6 link connections (102) exist between the switched network chip A and a switched network chip C, which is called as Trunk=6.

It is assumed that a chip D and a chip E in FIG. 1 are two destination chips respectively. When a destination address of a certain unicast cell is D, it is required to go through the switched network chip A to complete a load balancing link selection with the Trunk=4, reach the switched network chip B, and then reach the destination chip D; and when a destination address of a certain unicast cell is E, it is required to go through the switched network chip A to complete a load balancing link selection with the Trunk=6, reach the switched network chip C, and then reach the destination chip E. When destination addresses of a certain multicast cell are D and E, it is firstly required to complete cell replication of the two destination addresses at the switched network chip A, then one cell therein completes the load balancing link selection with the Trunk=4 and reaches the D through the B, and the other cell completes the load balancing link selection with the Trunk=6 and reaches the E through the C.

However, there still lacks an explicit settlement mechanism on how to implement the processing for data cells.

SUMMARY OF THE INVENTION

The technical problem required to be solved by the present document is to provide a method and device for processing data cells, to improve the switching efficiency.

In order to solve the above technical problem, the present document provides a method for processing data cells, which comprises: configuring a unicast routing table and a multicast routing table, wherein, the unicast routing table includes a corresponding relation between unicast destination addresses and port trunking (Trunks), and the multicast routing table includes a corresponding relation between multicast group addresses and Trunks;

receiving data cells;

determining a corresponding port trunking (Trunk) according to a type of the data cell, if the data cell is a unicast cell, extracting a destination address of the unicast cell, querying the unicast routing table, and obtaining a Trunk corresponding to the unicast cell; and if the data cell is a multicast cell, extracting a multicast group address of the multicast cell, querying the multicast routing table, and obtaining one or more Trunks corresponding to the multicast cell; and selecting an output link from the determined Trunks according to a preset load balancing policy, and sending the data cells through the selected output link.

Preferably, the load balancing policy comprises one or any combination of the following:

a buffer depth selection policy, wherein, an output port of each output link corresponds to a virtual output queue used for buffering data cells to be sent, a selection is made according to a buffer depth of the virtual output queue of each output port;

a mask selection policy, wherein, a selection is made from masks corresponding to ports which are not selected by utilizing a corresponding relation between masks and ports in a selection mask register;

randomly selecting from ports to be selected.

Preferably, when the ports are selected through the selection mask register, a bit-width of the mask is equal to the number of the ports, and selection masks corresponding to different Trunks are same or different.

Preferably, a flipping rule of the selection masks comprises:

when it is indicated that all selection masks of the selection mask register have been selected, flipping all the selection masks;

if results obtain by adding all the selection masks of the selection mask register with valid link information are all invalid values, flipping into a negation of a previous output result.

Preferably, selecting an output link from the corresponding Trunks according to a preset load balancing policy comprises:

(a) determining alternative ports from links to be selected according to the selection mask register, if an alternative port is unique, selecting the alternative port as a final output port; if there exist more than one alternative ports, executing step (b); and if there exists no alternative port, executing step (c);

(b) selecting the output port from the alternative ports according to the depth of the virtual output queue, if a port with the minimum depth is unique, selecting the alternative port with the minimum depth as a final output port, and if the port with the minimum depth is not unique, randomly selecting one of the alternative ports with the minimum depth as the final output port;

(c) selecting output ports from the links to be selected according to the depth of the virtual output queue, if a port with the minimum depth is unique, selecting the port with the minimum depth as a final output port, and if the port with the minimum depth is not unique, randomly selecting one of the ports with the minimum depth as the final output port;

(d) flipping a mask corresponding to the final output port, and ending the flow.

Preferably, before determining the corresponding Trunks and selecting the output link, the method further comprises: eliminating invalid physical links and/or preset invalid links from all output links to obtain valid links, and selecting the output link from the valid links.

In order to solve the above technical problem, the present document further provides a device for processing data cells, which comprises:

a configuration module, configured to: configure a unicast routing table and a multicast routing table, wherein, the unicast routing table includes a corresponding relation between unicast destination addresses and port trunking (Trunks), and the multicast routing table includes a corresponding relation between multicast group addresses and Trunks;

a receiving module, configured to: receive data cells;

a Trunk determination module, configured to: determine a corresponding port trunking (Trunk) according to a type of the data cell, if the data cell is a unicast cell, extract a destination address of the unicast cell, query the unicast routing table, and obtain a Trunk corresponding to the unicast cell; and if the data cell is a multicast cell, extract a multicast group address of the multicast cell, query the multicast routing table, and obtain one or more Trunks corresponding to the multicast cell;

an output link selection module, configured to: select an output link from the Trunks determined by the Trunk determination module according to a preset load balancing policy; and a sending module, configured to: send the data cells through the selected output link.

Preferably, the load balancing policy on which is based when the output link selection module selects the output link comprises one or any combination of the following:

a buffer depth selection policy, wherein, an output port of each output link corresponds to a virtual output queue used for buffering data cells to be sent, a selection is made according to a buffer depth of the virtual output queue of each output port;

a mask selection policy, wherein, a selection is made from masks corresponding to ports which are not selected by utilizing a corresponding relation between masks and ports in a selection mask register;

randomly selecting from ports to be selected.

Preferably, when the ports are selected through the selection mask register, a bit-width of the masks is equal to the number of the ports, and selection masks corresponding to different Trunks are same or different; a flipping rule of the selection masks comprises:

when it is indicated that all selection masks of the selection mask register have been selected, flipping all the selection masks;

if results obtain by adding all the selection masks of the selection mask register with valid link information are all invalid values, flipping into a negation of a previous output result.

Preferably, the output link selection module comprises:

a main circuit, configured to: determine alternative ports from valid links according to the selection mask register, when an alternative port is unique, select the alternative port as an output port; when there exist more than one alternative ports, select output ports from the alternative ports according to the depth of the virtual output queue, if a port with the minimum depth is unique, select the alternative port with the minimum depth as an output port, and if the port with the minimum depth is not unique, randomly select one of the alternative ports with the minimum depth as the output port;

a secondary circuit, configured to: select output ports from the valid links according to the depth of the virtual output queue, if a port with the minimum depth is unique, select the port with the minimum depth as an output port, and if the port with the minimum depth is not unique, randomly select one of the ports with the minimum depth as the output port;

a port determination submodule, configured to: when the output port is selected at the main circuit, determine an output result of the main circuit as a final output port; when the output port is not selected at the main circuit and the output port is selected at the secondary circuit, determine an output result of the secondary circuit as a final output port; and a mask flipping submodule, configured to: flip a corresponding mask according to the port determination submodule.

With the method and device of the example of the present document, a scheme for processing data cells in the switched network is provided, which improves the switching efficiency; and with the preset load balancing policy, the load balancing of the data cell between different links can be effectively implemented, thereby guaranteeing a service traffic balance of each link, and reducing the delay of the data cell within the switched network at the meantime.

BRIEF DESCRIPTION OF DRAWINGS

The accompanying drawings are used to provide a further understanding of the present document, constitute a part of the present document, and explain the present document together with the examples of the present document, but do not constitute a limitation on the present document. In the drawings.

PREFERRED EMBODIMENTS OF THE INVENTION

Figure 1:
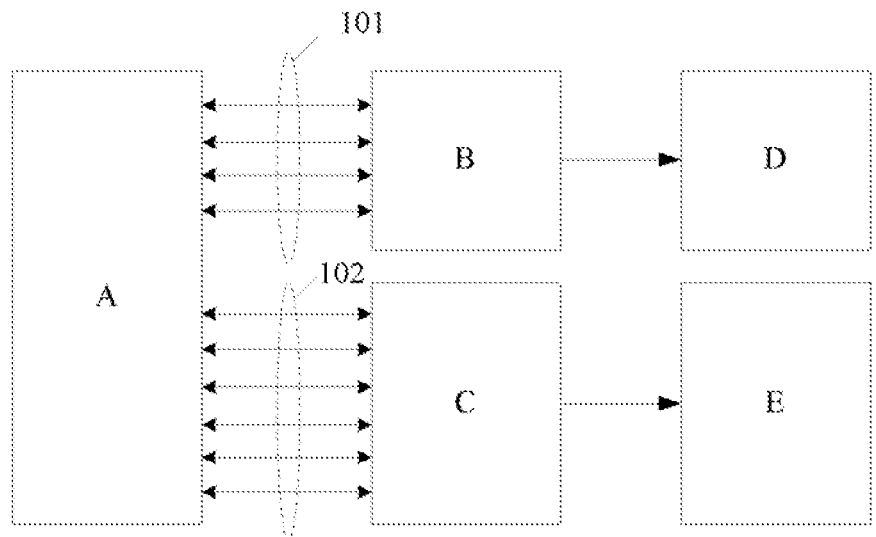
FIG. 1 is a schematic diagram of connection of Trunks of the switched network according to the present document.
Figure 2:
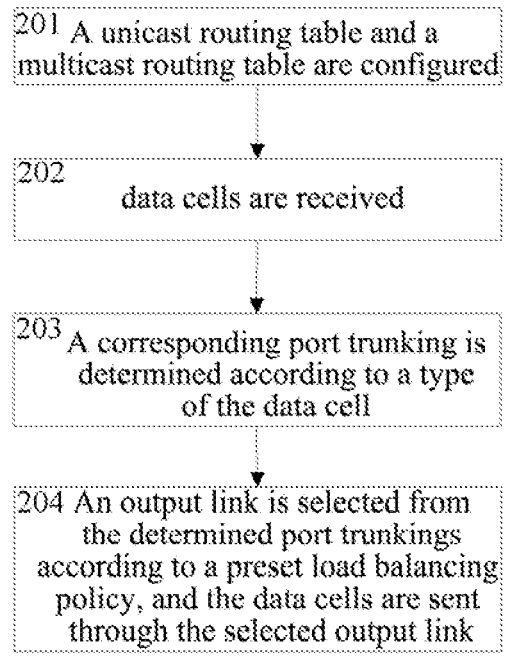
FIG. 2 is a schematic diagram of a method for processing data cells according to the present document.

As shown in FIG. 2, a method for processing data cells according to the present document includes the following steps.

In step 201, a unicast routing table and a multicast routing table are configured, wherein, the unicast routing table includes a corresponding relation between unicast destination addresses and port trunking (Trunks), and the multicast routing table includes a corresponding relation between multicast group addresses and Trunks.

In step 202, data cells are received.

In step 203, a corresponding port trunking (Trunk) is determined according to a type of the data cell, if the data cell is a unicast cell, a destination address of the unicast cell is extracted, the unicast routing table is queried, and a Trunk corresponding to the unicast cell is obtained; and if the data cell is a multicast cell, a multicast group address of the multicast cell is extracted, the multicast routing table is queried, and one or more Trunks corresponding to the multicast cell are obtained.

In step 204, an output link is selected from the determined Trunks according to a preset load balancing policy, and the data cells are sent through the selected output link.

The load balancing policy includes one or any combination of the following:

a buffer depth selection policy, wherein, an output port of each output link corresponds to a virtual output queue used for buffering data cells to be sent, a selection is made according to the buffer depth of the virtual output queue of each output port a mask selection policy, wherein, a selection is made from masks corresponding to ports which are not selected by utilizing a corresponding relation between masks and ports in a selection mask register;

randomly selecting from ports to be selected.

Before determining the corresponding Trunks and selecting the output link, the method also includes: eliminating invalid physical links and/or preset invalid links from all output links to obtain valid links, and selecting the output link from the valid links.

The above load balancing policies can be used independently and also can be used in a combination by combining different logic relationships.

It should be noted that the examples in the present document and the characteristics in the examples can be combined with each other in the condition of no conflict.

The preferred examples of the present document will be described in combination with the accompanying drawings below. The preferred examples described here are only used to describe and explain the present document, which is not used to limit the present document.

EXAMPLE 1

Figure 3:
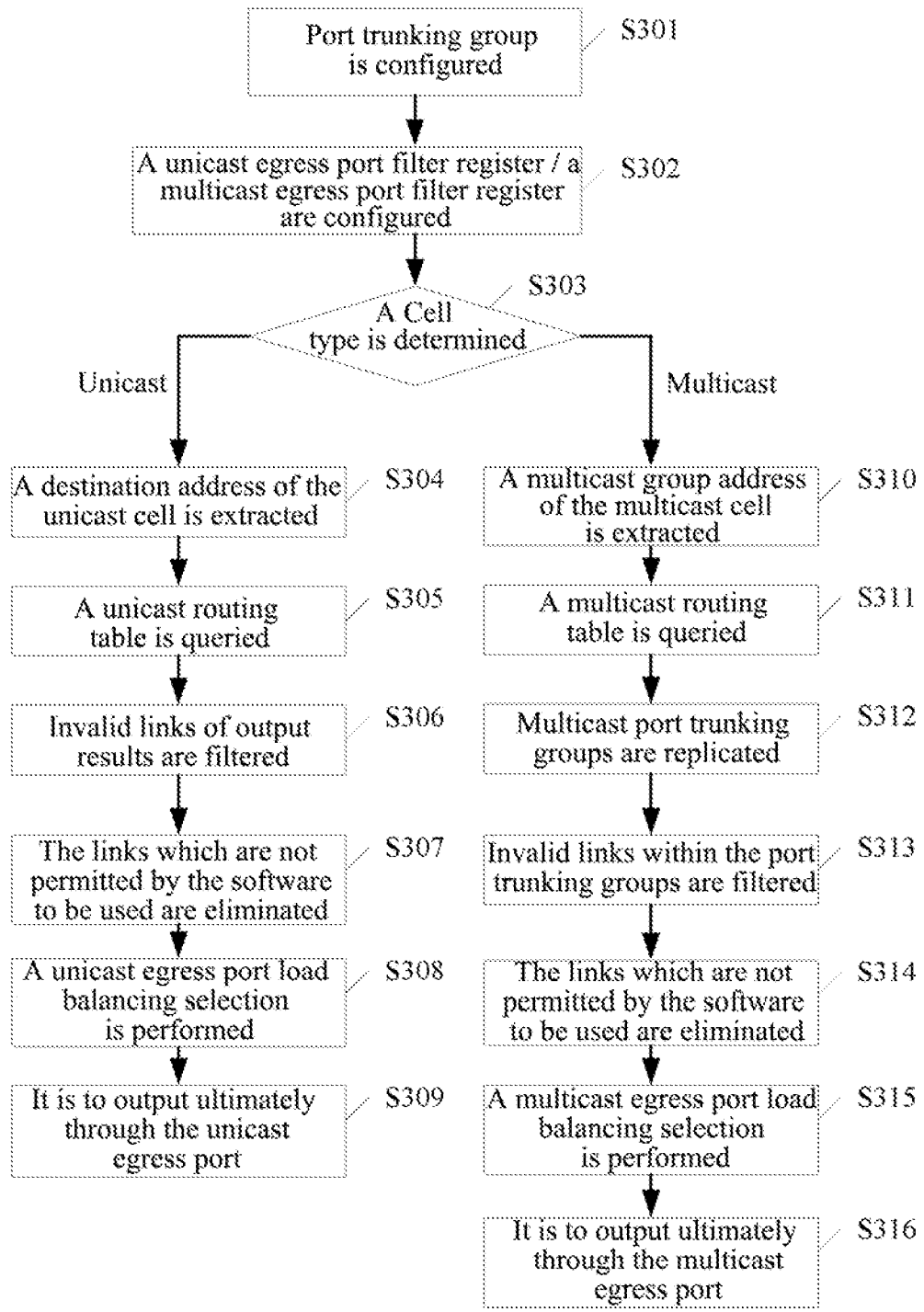
FIG. 3 is a schematic diagram of a flow for processing data cells according to the example of the present document.

As shown in FIG. 3, a flow diagram of processing data cells includes the following steps.

In step S301, Trunk group is configured through the software, a unicast routing table and a multicast routing table are configured, wherein, the unicast routing table includes a corresponding relation between unicast destination addresses and port trunking (Trunks), and the multicast routing table includes a corresponding relation between multicast group addresses and Trunks.

The trunk group is related to actual networking, only one kind of Trunk groups exist in each networking structure generally, and different Trunk groups will not appear in the same networking structure.

In step S302, a unicast egress port filter register (Mask) and a multicast egress port Mask are configured through the software.

The unicast egress port Mask and the multicast egress port Mask refer to that a user can set whether certain links can be used for outputting unicast data or multicast data as required.

In step S303, a type identification is performed on the received data cell, if it is the unicast cell, step S304 is executed, and if it is the multicast cell, step S310 is executed.

In step S304, destination address information carried by the unicast cell is extracted.

In step S305, the unicast routing table is queried according to the destination address information extracted in step S304, and a Trunk number of the corresponding unicast output is obtained.

In step S306, invalid physical links are filtered based on the Trunk number output in step S305, and all valid links in the Trunk corresponding to the unicast output are obtained.

The invalid physical links refer to links whose physical circuits are abnormal, which are caused by an abrupt interruption of links or an excessively high transmission error rate. If such links are used to transmit data, it cannot be guaranteed that the data can be sent correctly.

In step S307, based on step S306, the invalid links which are not permitted by the software configuration to perform unicast output are eliminated, and all the final valid links which can output the unicast cell are obtained.

In step S308, in the links selected in step S307, a output link selection is completed according to a Virtual Output Queue (VOQ) buffer depth.

Each output port of the switched network chip corresponds to a VOQ buffer, which is used for storing data for which a link lookup selection has been completed but which have not been set. If the VOQ buffer depth of a certain port is comparatively deep, it is indicated that the unsent data overstocked at this port are comparatively much, if it is still to select to transmit the data towards this link, the congestion degree of this link will be even worsened; on the contrary, If the VOQ buffer depth of a certain port is comparatively shallow, it is indicated that the unsent data overstocked at this port are comparatively little, transmission on the link is relatively unobstructed, thus such links will be preferably selected to perform data transmission.

In step S309, according to a link selected in step S308, the unicast cell is sent through that link, processing of the unicast flow is completed currently, and it is to return to step S303.

In step S310, multicast group address information carried by the multicast cell is extracted.

In step S311, the multicast routing table is queried according to the multicast group address information extracted in step S310, and Trunk groups which should be replicated by the multicast cell are obtained.

In step S312, the multicast cell is replicated to each Trunk group, that is, the multicast cell is output to each Trunk.

In step S313, invalid physical links are filtered within each Trunk, and valid physical links which can perform transmission are obtained.

In step S314, the links which are not permitted by the software configuration to perform multicast output are eliminated from all the valid physical links in the Trunks corresponding to the multicast output in step S313, and all the final valid links which can output the multicast cell are obtained.

In step S315, in the links selected in step S314, a output link selection is completed according to a Virtual Output Queue (VOQ) buffer depth within each Trunk (specifically, see step 308).

In step S316, according to the results of step S315, step S313 to step S315 are repeated to complete the replication and output of the multicast cell, and it is to return to step S303.

In order to further understand the examples of the present document, the technical scheme provided by the present document will be described through the specific examples below.

If a certain cell A to be processed is determined as a unicast cell after undergoing type identification, a destination address carried by the cell A is extracted to query the unicast routing table, and after invalid links are filtered from table lookup results, it is known that three links 0#, 1# and 2# can be accessible, it is assumed that a selection result of the last time is the link 0#, a selection will be made between the link 1# and the link 2# this time. If the VOQ buffer depths of link 1# and the link 2# are equal, one of the link 1# and the link 2# can be randomly selected as the output link; and if the VOQ buffer depth of link 1# and that of the link 2# are not equal, a link which has a comparatively shallow VOQ buffer depth will be selected as the output link this time.

If a certain cell B to be processed is determined as a multicast cell after undergoing type identification, a multicast group address carried by the cell B is extracted to query the multicast routing table, and Trunk groups required to be replicated are obtained, it is assumed that the Trunk groups are required to be replicated to a Trunk M and a Trunk N, processing similar to the processing of the above unicast cell A is executed within the Trunk M and Trunk N, respectively. Finally, an output link is selected within the Trunk M, and an output link is selected within the Trunk N, which are used to output the multicast cell B respectively.

Figure 4:
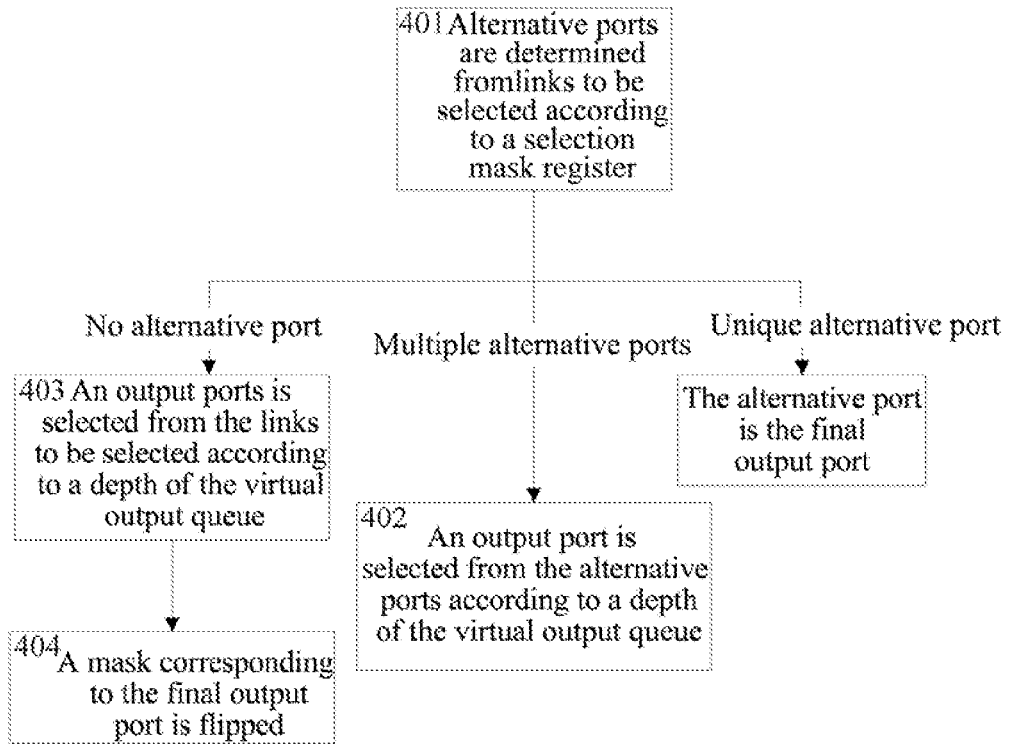
FIG. 4 is a schematic diagram of an implementation way for selecting an output port according to the present document.
Figure 5:
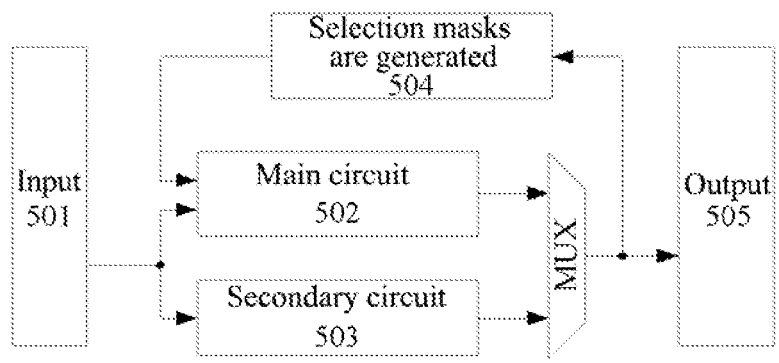
FIG. 5 is a schematic diagram of structures of a main circuit and a secondary circuit of a load balancing circuit according to the present document.

In the above example 1, when the output link is determined in the determined Trunks, the valid links are selected from all the links, and then the output link is selected according to the Virtual Output Queue (VOQ) buffer depth. Convertibly, as shown in FIG. 4, each Trunk also can determine the output link by the following way:

(401) determining alternative ports from links to be selected according to a selection mask register, if an alternative port is unique, selecting the alternative port as a final output port; if there exist more than one alternative ports, executing step (402); and if there exists no alternative port, executing step (403);

(402) selecting the output port from the alternative ports according to the depth of the virtual output queue, if a port with the minimum depth is unique, selecting the alternative port with the minimum depth as a final output port, and if the port with the minimum depth is not unique, randomly selecting one of the alternative ports with the minimum depth as the final output port;

(403) selecting the output port from the links to be selected according to the depth of the virtual output queue, if a port with the minimum depth is unique, selecting the port with the minimum depth as a final output port, and if the port with the minimum depth is not unique, randomly selecting one of the ports with the minimum depth as the final output port;

(404) flipping a mask corresponding to the final output port, and ending the flow. Specifically, the above flow of FIG. 4 can be implemented through two subcircuits, and as shown in FIG. 5, they are called as a main circuit and a secondary circuit in the present document.

The main circuit has a selection memory function, a selection mask register is set in the circuit, which can record a selection result of this time and can act on a load balancing selection operation of the next time, thereby guaranteeing that all the ports will not be selected continuously.

A bit-width of the selection mask of the main circuit is equal to the number of the ports of the switched network, an one-to-one correspondence exists between each bit and each port, a mask rule is, when ports are selected according to the current result, setting bits corresponding to those ports as 0 (it is a specific example here, it also can be certainly set as 1, and the following settings are changed correspondingly), and bits which are not selected keep original values.

The selection masks of the main circuit are also affected by the Trunk configurations, and they are divided into different Trunk groups, and a flipping rule of the selection masks within each Trunk is:

1) when the selection masks within the Trunks are all 0s, flipping into all 1s, and acting on an selection operation of the next time, that is, when it is indicated that all the selection masks of the selection mask register have been selected, flipping all the selection masks;

2) if results obtain by adding the selection masks within the Trunks with valid link information are all 0s, flipping into a negation of a previous output result, that is, if results obtain by adding the selection masks within the Trunks with the valid link information are all invalid values, flipping into a negation of the previous output result.

Taking Trunk=4 as an example, the selection mask is 4'b1100, valid link information is 4'b1111, 4'b1100 is obtained by adding the selection mask 4'b1100 with the valid link information 4'b1111, thus one can be selected from the two links of 1, such as 1 of bit 2, and an output result is 4'b0100, the processing of the current cell is finished, and then the processing of the next cell is performed. At the point, the selection mask turns to 4'b1000, the newly entered valid link information is 4'b0011, 4'b0000 is obtained by adding the selection mask 4'b1000 with the valid link information 4'b0011, thus the main circuit cannot select a result. In such a case, it is required to use a result of the secondary circuit, and the selection masks are flipped into a negation 4'b1011 of the previous output result 4'b0100.

The secondary circuit has a full port selection function, which ensures that the result of the secondary circuit can be used when no valid result is output in the main circuit.

The main circuit and the secondary circuit perform concurrent operations each time, a selection of the final results abides by the following rule: when the result of the main circuit is valid (that is, "valid" refers to that a unique output port is determined), the result of the main circuit is output; when the result of the main circuit is invalid and the result of the secondary circuit is valid, the result of the secondary circuit is output; and when the results of both the main circuit and the secondary circuit are invalid, an invalidation result is output currently.

FIG. 5 is a structure diagram of the load balancing circuit according to the present document, the input (501) are all valid link information and VOQ buffer depth information, the information is sent to the main circuit (502) and the secondary circuit (503) simultaneously, the selection masks (504) calculated according to the output result at each time (i.e. the masks on which the flipping processing is performed according to the selected ports) are sent to the main circuit at the meantime, the main circuit and the secondary circuit perform calculations synchronously and calculate a result respectively, and the output (505) is completed after going through a selection of MUX.

Figure 6:
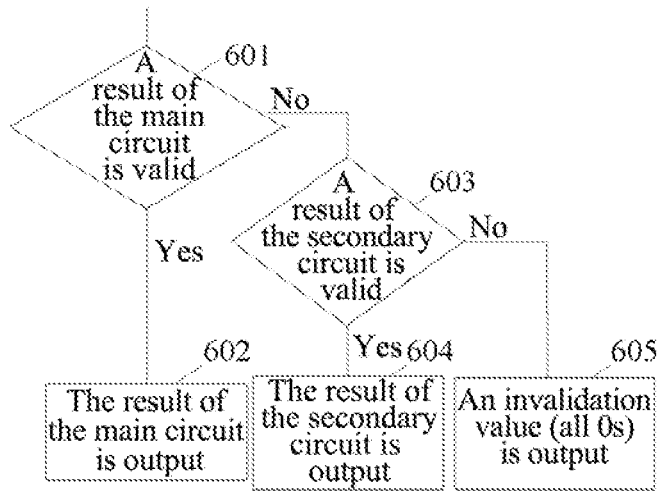
FIG. 6 is a flow diagram of selecting output results of a main circuit and a secondary circuit of a load balancing circuit according to the present document.

FIG. 6 is a flow diagram of selecting output results of the main circuit and the secondary circuit, firstly the MUX judges whether an output result of the main circuit is valid (601), if the output result of the main circuit is valid, the result of the main circuit is output (602), if the output result of the main circuit is invalid, it judges whether a result of the secondary circuit is valid (603), if the output result of the secondary circuit is valid, the result of the secondary circuit is output (604), and if the result of the secondary circuit is invalid, an invalidation value is output (605).

Figure 7:
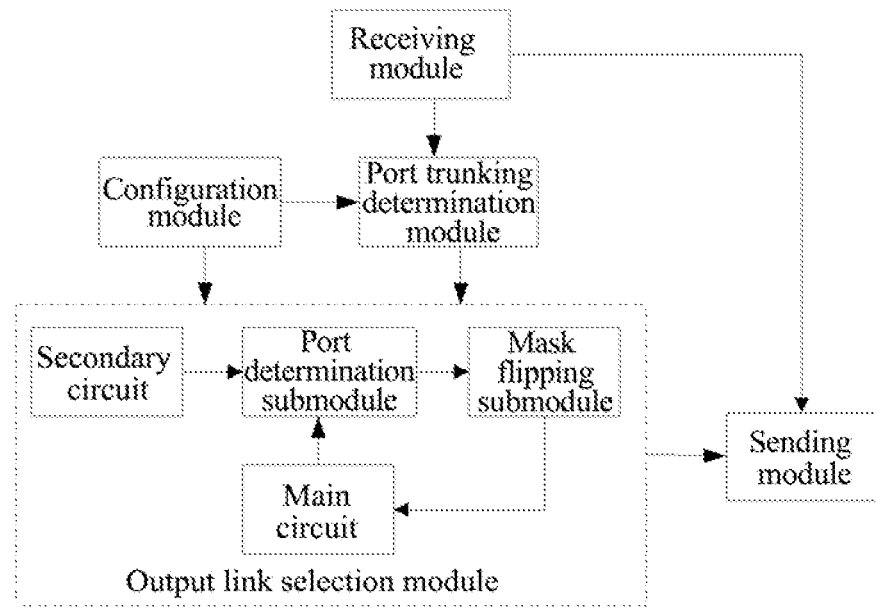
FIG. 7 is a schematic diagram of a module structure of a device for processing data cells according to the present document.

Corresponding to the above method, the present document further provides a device for processing the data cell, and as shown in FIG. 7, the device includes:

a configuration module, used to: configure a unicast routing table and a multicast routing table, wherein, the unicast routing table includes a corresponding relation between unicast destination addresses and port trunking (Trunks), and the multicast routing table includes a corresponding relation between multicast group addresses and Trunks;

a receiving module, used to: receive data cells;

a Trunk determination module, used to: determine a corresponding port trunking (Trunk) according to a type of the data cell, if the data cell is a unicast cell, extract a destination address of the unicast cell, query the unicast routing table, and obtain a Trunk corresponding to the unicast cell; and if the data cell is a multicast cell, extract a multicast group address of the multicast cell, query the multicast routing table, and obtain one or more Trunks corresponding to the multicast cell;

an output link selection module, used to: select an output link from the Trunks determined by the Trunk determination module according to a preset load balancing policy; and a sending module, used to: send the data cells through the selected output link.

If a VOQ buffer queue is used, data cells required to be output are saved in the VOQ buffer queue of a final output port to be output; each queue maintains a VOQ buffer depth counter, which is added by 1 when a cell is input, and is subtracted by 1 when a cell is output, and VOQ buffer depth information is output to the output link selection module in real time.

Preferably, the load balancing policy on which is based when the output link selection module selects the output link comprises one or any combination of the following:

a buffer depth selection policy, wherein, an output port of each output link corresponds to a virtual output queue used for buffering data cells to be sent, a selection is made according to buffer depth of the virtual output queue of each output port;

a mask selection policy, wherein, a selection is made from masks corresponding to ports which are not selected by utilizing a corresponding relation between masks and ports in a selection mask register;

randomly selecting from ports to be selected.

Furthermore, when the ports are selected through the selection mask register, a bit-width of the mask is equal to the number of the ports, and selection masks corresponding to different Trunks are same or different.

A flipping rule of the selection masks includes:

when it is indicated that all selection masks of the selection mask register have been selected, flipping all the selection masks;

if results obtain by adding all the selection masks of the selection mask register with valid link information are all invalid values, flipping into a negation of a previous output result.

Corresponding to FIG. 4, the output link selection module includes:

a main circuit, used to: determine alternative ports from valid links according to the selection mask register, when an alternative port is unique, select the alternative port as an output port; when there exist more than one alternative ports, select output ports from the alternative ports according to the depth of the virtual output queue, if a port with the minimum depth is unique, select the alternative port with the minimum depth as an output port, and if the port with the minimum depth is not unique, randomly select one of the alternative ports with the minimum depth as the output port;

a secondary circuit, configured to: select output ports from the valid links according to the depth of the virtual output queue, if a port with the minimum depth is unique, select the port with the minimum depth as an output port, and if the port with the minimum depth is not unique, randomly select one of the ports with the minimum depth as the output port a port determination submodule, configured to: when the output port is selected at the main circuit, determine an output result of the main circuit as a final output port; when the output port is not selected at the main circuit and the output port is selected at the secondary circuit, determine an output result of the secondary circuit as a final output port; and a mask flipping submodule, configured to: flip a corresponding mask according to the port determination submodule.

Figure 8:
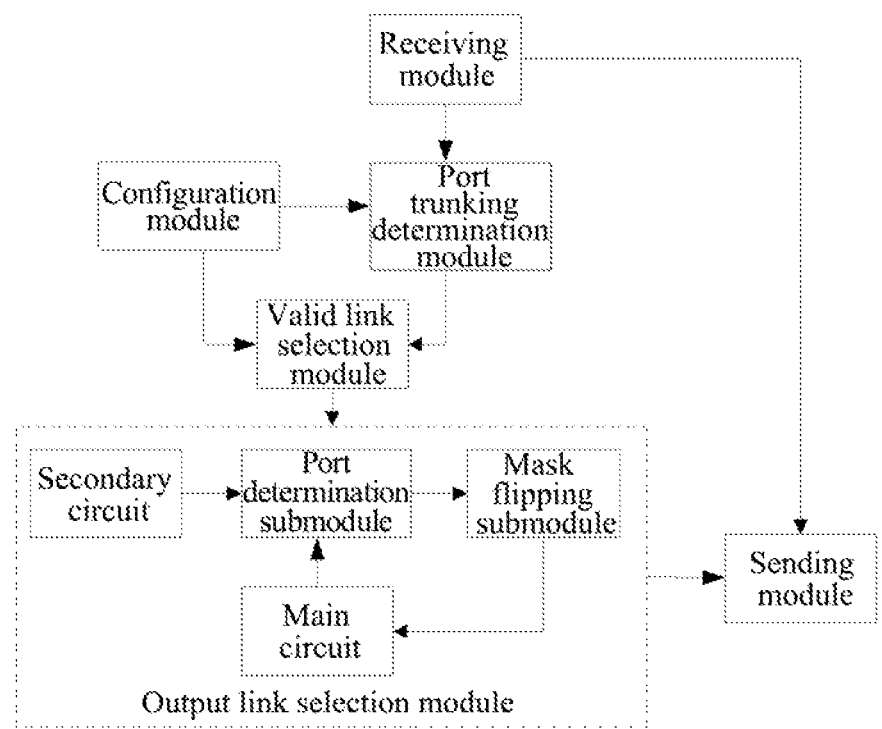
FIG. 8 is a schematic diagram of a module structure of another device for processing data cells according to the present document.

FIG. 8 is a schematic diagram of another device, a difference from FIG. 7 lies in that, the device further includes a valid link selection module which is used to eliminate invalid physical links and/or preset invalid links from all output links to obtain valid links, and the output link selection module selects the output link from the valid links.

The above description is only the preferred examples of the present document, which is not used to limit the scope of the present document.

Those skilled in the art can make various modifications and variations for the present document without departing from the spirit and scope of the present document. Therefore, if these modifications and variations of the present document belong to the scope of the claims of the present document and the equivalent techniques thereof, the present document also intends to include these modifications and variations.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or more integrated circuits. Correspondingly, each module in the above examples can be implemented in a form of hardware, and also can be implemented in a form of software function module. The present document is not limited to any combination of hardware and software in a specific form.

In a situation that there exist multiple paths accessible to a destination, an optimal output path is selected according to the buffer depth of output ports or the buffer depth of links, thus the load balancing of unicast and the load balancing and replication of multicast are implemented.

By utilizing the load balancing policy provided by the present document, the load balancing of the data cells between different links can be effectively implemented, which guarantees a service traffic balance of each link, and reduces the delay of the data cell within the switched network at the meantime, and improves the switching efficiency.

INDUSTRIAL APPLICABILITY

With the method and device of the example of the present document, a scheme for processing data cells in the switched network is provided, which improves the switching efficiency; and with the preset load balancing policy, the load balancing of the data cells between different links can be effectively implemented, thereby guaranteeing a service traffic balance of each link, and reducing the delay of the data cell within the switched network at the meantime.

What is claimed is:

1. A method for processing data cells, comprising:
   configuring a unicast routing table and a multicast routing table, wherein, the unicast routing table includes a corresponding relation between unicast destination addresses and port trunking groups (Trunks), and the multicast routing table includes a corresponding relation between multicast group addresses and Trunks;

receiving data cells;
determining a corresponding Trunk according to a type of the data cell, if the data cell is a unicast cell, extracting a destination address of the unicast cell, querying the unicast routing table, and obtaining a Trunk corresponding to the unicast cell; and if the data cell is a multicast cell, extracting a multicast group address of the multicast cell, querying the multicast routing table, and obtaining one or more Trunks corresponding to the multicast cell; and
selecting an output link from each determined Trunk according to a preset load balancing policy, and sending the data cells through the selected output link;
wherein, selecting an output link from each corresponding Trunks according to a preset load balancing policy comprises:
(a) determining alternative ports from links to be selected according to the selection mask register, if an alternative port is unique, selecting the alternative port as a final output port; if there exist more than one alternative ports, executing step (b); and if there exists no alternative port, executing step (c);
(b) selecting the output port from the alternative ports according to the depth of the virtual output queue, if a port with a minimum depth is unique, selecting an alternative port with the minimum depth as a final output port, and if the port with the minimum depth is not unique, randomly selecting one of the alternative ports with the minimum depth as the final output port;
(c) selecting output ports from the links to be selected according to the depth of the virtual output queue, if a port with a minimum depth is unique, selecting the port with the minimum depth as a final output port, and if the port with the minimum depth is not unique, randomly selecting one of the ports with the minimum depth as the final output port;
(d) flipping a mask corresponding to the final output port, and ending the flow.

2. The method according to claim 1, wherein, the load balancing policy comprises one or any combination of the following:
a buffer depth selection policy, wherein, an output port of each output link corresponds to a virtual output queue used for buffering data cells to be sent, a selection is made according to a buffer depth of the virtual output queue of each output port;
a mask selection policy, wherein, a selection is made from masks corresponding to ports which are not selected by utilizing a corresponding relation between masks and ports in a selection mask register;
randomly selecting from ports to be selected.

3. The method according to claim 2, wherein, when the ports are selected through the selection mask register, a bit-width of the mask is equal to a number of the ports, and selection masks corresponding to different Trunks are same or different.

4. The method according to claim 2, wherein, a flipping rule of the selection masks comprises:
when it is indicated that all selection masks of the selection mask register have been selected, flipping all the selection masks;
if results obtain by adding the selection masks of the selection mask register with valid link information are all invalid values, flipping into a negation of a previous output result.

5. The method according to claim 1, wherein, before determining the corresponding Trunks and selecting the output link, the method further comprises: eliminating invalid physical links and/or preset invalid links from all output links to obtain valid links, and selecting the output link from the valid links.

6. A device for processing data cells, comprising:
a configuration circuit, configured to: configure a unicast routing table and a multicast routing table, wherein, the unicast routing table includes a corresponding relation between unicast destination addresses and port trunking (Trunks), and the multicast routing table includes a corresponding relation between multicast group addresses and Trunks;
a receiving circuit, configured to: receive data cells;
a Trunk determination circuit, configured to: determine a corresponding Trunk according to a type of the data cell, if the data cell is a unicast cell, extract a destination address of the unicast cell, query the unicast routing table, and obtain a Trunk corresponding to the unicast cell; and if the data cell is a multicast cell, extract a multicast group address of the multicast cell, query the multicast routing table, and obtain one or more Trunks corresponding to the multicast cell;
an output link selection circuit, configured to: select an output link from each Trunk determined by the Trunk determination circuit according to a preset load balancing policy; and
a sending circuit, configured to: send the data cells through the selected output link;
wherein, the output link selection circuit comprises:
a main circuit, configured to: determine alternative ports from valid links according to the selection mask register, when an alternative port is unique, select the alternative port as an output port; when there exist more than one alternative ports, select output ports from the alternative ports according to the depth of the virtual output queue, if a port with a minimum depth is unique, select an alternative port with the minimum depth as an output port, and if the port with the minimum depth is not unique, randomly select one of the alternative ports with the minimum depth as the output port;
a secondary circuit, configured to: select output ports from the valid links according to the depth of the virtual output queue, if a port with a minimum depth is unique, select the port with the minimum depth as an output port, and if the port with the minimum depth is not unique, randomly select one of the ports with the minimum depth as the output port;
a port determination circuit, configured to: when the output port is selected at the main circuit, determine an output result of the main circuit as a final output port; when the output port is not selected at the main circuit and the output port is selected at the secondary circuit, determine an output result of the secondary circuit as a final output port; and
a mask flipping circuit, configured to: flip a corresponding mask according to the port determination circuit.

7. The device according to claim 6, wherein, the load balancing policy on which is based when the output link selection circuit selects the output link comprises one or any combination of the following:
a buffer depth selection policy, wherein, an output port of each output link corresponds to a virtual output queue used for buffering data cells to be sent, a selection is made according to a buffer depth of the virtual output queue of each output port;
a mask selection policy, wherein, a selection is made from masks corresponding to ports which are not selected by utilizing a corresponding relation between masks and ports in a selection mask register;

randomly selecting from ports to be selected.

8. The device according to claim 7, wherein, when the ports are selected through the selection mask register, a bit-width of the mask is equal to a number of the ports, and selection masks corresponding to different Trunks are same or different; a flipping rule of the selection masks comprises:

when it is indicated that all selection masks of the selection mask register have been selected, flipping all the selection masks;

if results obtain by adding all the selection masks of the selection mask register with valid link information are all invalid values, flipping into a negation of a previous output result.

* * * * *